Patented Dec. 18, 1923.

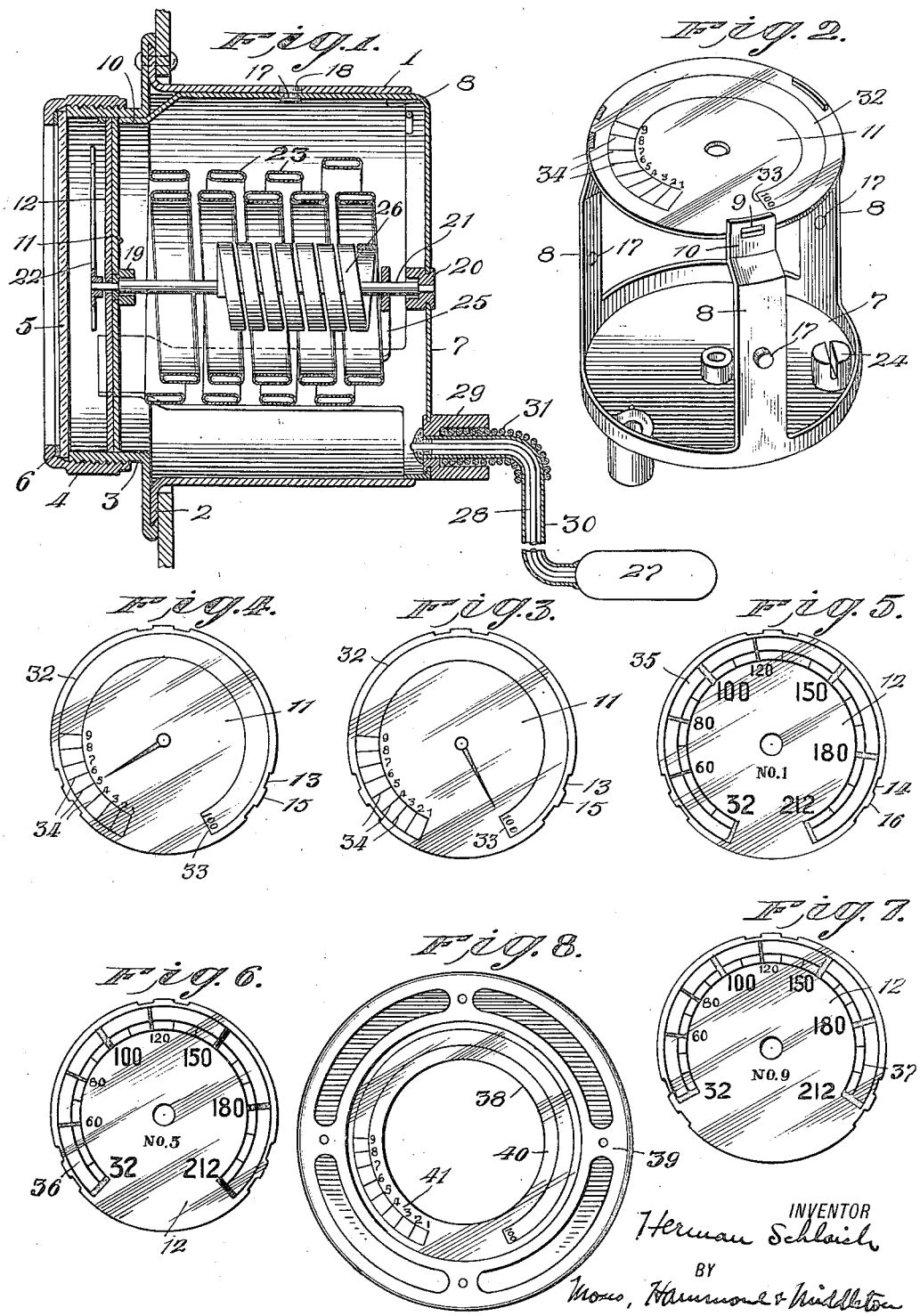

1,477,666

UNITED STATES PATENT OFFICE.

HERMAN SCHLAICH, OF NEW YORK, N. Y.

CALIBRATION OF INSTRUMENTS.

Application filed December 24, 1920. Serial No. 432,978.

*To all whom it may concern:*

Be it known that I, HERMAN SCHLAICH, a citizen of Germany, having declared his intention of becoming a citizen of the United States, residing in the borough of Brooklyn, city of New York, county of Kings, State of New York, have invented certain new and useful Improvements in Calibration of Instruments, of which the following is a specification.

This invention relates to improvements in calibration of instruments adapted for indicating purposes such as thermometers, gages and the like, and has for its object to provide for the ready calibration of such instruments in an economical manner without necessity of employing skilled labor.

The invention is applicable in connection with indicating instruments having an indicating hand adapted to travel over a scale including certain fixed points which may be definitely and accurately determined, whereby proper calibration of the instrument may be effected. Owing to slight mechanical differences which may occur in the construction of the means for actuating the indicating hand, the hand will not always travel the same distance in passing from one of the fixed points to the other thereof, and consequently it is impossible to provide a single dial having a scale of a predetermined length adapted for use under all circumstances. In accordance with my invention I provide a plurality of dials bearing scales differing slightly in length whereby one or the other thereof may be employed, depending upon the travel of the indicating hand in passing from one of the known points to another thereof, which length of travel may be readily ascertained by preliminarily causing the indicating hand of the instrument to assume, successively, positions corresponding with such known points.

While my invention is applicable to indicating instruments of various kinds, it is particularly applicable to thermometers of the type having an indicating hand secured to a rotatable arbor, and for purposes of illustration the invention is shown in connection with a temperature indicating instrument such as shown and described in my co-pending application, Serial No. 293,265, filed April 28, 1919.

In the accompanying drawings, forming part of this application, wherein I have shown two embodiments of my invention for the purpose of illustrating the principle thereof:

Figure 1, is a vertical sectional view illustrating my invention as embodied in a thermometer of the "distance type;"

Figure 2 is a perspective view of the casing back, dial supporting arms, and calibration dial plate;

Figures 3 and 4 are diagrammatic views illustrating the positions occupied by the indicating hand with respect to the calibration dial at certain known temperatures which determine the extent or rate of travel of the hand;

Figures 5, 6 and 7 are face views of certain ones of the series of indicating dial plates, and Figure 8 is a front view of a modified form of casing.

Referring to the drawings wherein, for purposes of illustration, the invention is shown in connection with a temperature indicating instrument such as is shown and described in my co-pending application above referred to, the casing of the instrument comprises a cylindrical shell 1, having a flange 2 at its front end to which is secured an annular member 3 having a thread formed therein adapted to be engaged by the thread of a bezel 4. The front of the casing is closed by a glass plate 5 held in position between the bezel 4 and the annular member 3, and a packing 6, of any suitable material, is inserted between the bezel and the glass plate. The rear end of the casing is closed by a flanged plate 7 provided with a plurality of forwardly extending spring arms 8 having slots 9 formed in their front ends which are offset inwardly, as indicated at 10. The front ends of the arms 8 serve as supports for a calibration dial plate 11 and an indicating dial plate 12, hereinafter described, which are preferably formed of metal and are provided with notches 13 and 14, respectively, to receive the ends of the arms. Projecting from the bottom of the notches 13 and 14, are tongues 15 and 16 adapted to project through the slots 9 in the arms 8, as shown in Figure 1.

The arms fit snugly within the casing, and carry studs 17 adapted to be received within holes 18 formed in the casing wall to hold the plate 7 in position. As the arms 8 are resilient, they may be sprung inwardly sufficiently to permit the studs 17 to pass within the shell 1 until they come into register with the holes 18, at which time the studs will snap into the holes, thereby locking the parts together. The plate 7, and its associated parts, may be removed from the shell 1 by forcing the studs 17 inwardly to permit them to clear the holes 18 in the shell, whereupon the parts may be drawn apart.

Journaled within suitable bearings 19 and 20, carried by the dial 11 and the plate 7, respectively, is an arbor 21, to the front end of which is secured an indicating hand 22 adapted to travel over the front of the indicating dial 12 and to be visible through the glass plate 5.

The means for actuating the arbor 21 comprises a Bourdon spring or flattened tube 23, formed in a double coil having one of its ends secured to a slotted block 24 (Figure 2) carried by the plate 7, and its other end secured to one arm of a lever 25 rotatably supported on the arbor 21. Secured to the other arm of the lever is one end of a bi-metallic compensating coil 26, the other end of which is fastened to the arbor. The Bourdon coil is connected to a bulb 27 by means of a tube 28, which is introduced into the casing through a sleeve 29 secured to the plate 7. The tube 28 is preferably enclosed by a tubular jacket 30, and if desired, the jacket, or a portion thereof, may be provided with a covering of flexible armour 31. By means of this construction, the instrument is adapted to indicate changes in temperature occurring at a distant point, at which point the bulb 27 is adapted to be located. The coil, tube and bulb are filled with an expansible liquid, such as alcohol, glycerine or mercury.

It is to be understood that the invention is not limited to the construction and arrangement of the casing and the actuating mechanism shown, as the invention may be used in connection with any suitable instrument construction.

Referring to Figures 2, 3 and 4, the calibration dial plate 11 is provided upon its front surface with an arc-shaped scale 32 having a single indicating mark 33 at one end thereof and a plurality of indicating marks 34 at the other end thereof, and forming with the single mark a plurality of scales of different lengths. The numeral 100 or other suitable designation is placed upon the dial plate 11 in register with the indicating mark 33, and the numerals 1 to 9 inclusive are placed thereon in register with the several indicating marks 34.

A plurality of indicating dial plates 12 of like construction are provided, each of which has an arc-shaped scale on its front surface adapted to indicate temperatures, the range, in the example illustrated, being from 32° F. to 212° F. The scales on the several indicating dial plates vary in length, each scale being shorter than the next longer scale by an amount equal to the distance between adjacent marks 34 on the calibration dial plate 11, whereby when an indicating dial plate is placed upon the calibration dial plate with the indicating marks designated by the numerals 212 and 100 in register with one another, the indicating mark of the indicating dial plate, designated by the numeral 32, will register with one or the other of the indicating marks 34 on the calibration dial plate. The scales on the several indicating dial plates are provided with an equal number of temperature indicating marks which are proportionally spaced throughout the extent of the scales.

The nine indicating dial plates 12 are preferably designated by the numerals 1 to 9 inclusive, to correspond with the numerals registering with the marks 34 on the calibration dial plate 11, and the scales provided upon the indicating dial plates are of successively decreasing length so that, when a selected one of the dial plates 12 is placed upon the calibration dial 11 with its indicating mark 212 registering with the mark 100 of the calibration dial, the mark 32 of such indicating dial plate will register with that one of the marks 34 of the calibration dial plate which is designated by a number corresponding to the number of the indicating dial plate.

For purposes of illustration, indicating dial plates Nos. 1, 5 and 9 are shown in Figures 5, 6 and 7, respectively. Referring to Figure 5, the scale 35 is of such a length that the indicating marks 32 and 212 will register with the indicating marks 1 and 100 of the scale on the calibration dial plate, when the plates are in superposed relation. Referring to Figures 6 and 7, the scales 36 and 37 are of such a length that the indicating marks 32 thereon will register respectively with the indicating marks 5 and 9 of the calibration dial plate when the indicating marks 212 and 100 are in register. In like manner, the indicating mark 32 of the indicating dial plate No. 2 will register with indicating mark 2 of the calibration dial, when the marks 212 and 100 are in register, and so on with respect to the remaining dial plates.

To determine which one of the indicating dial plates should be used, the procedure is as follows:

After the calibration dial plate 11 has been properly secured to the arms 8, but before the securing of the indicating dial plate 12 thereto, the bulb 27 is placed in boiling water, whereupon the actuating means, which is responsive to the expansion of the liquid controlling the same, will cause the arbor 21 to rotate. When the arbor comes to rest and while the bulb is still in the boiling water, the indicating hand is adjusted thereon to cause it to register with the indicating mark 33 of the scale designated by the numeral 100, as indicated in Figure 3. The bulb 27 is then placed in ice, whereupon the arbor 21 will be caused to rotate in the opposite direction due to the contraction of the liquid. When the arbor 21 again comes to rest, the indicating hand will be in register, or approximately in register, with one or the other of the indicating marks 34, and the number on the scale registering with such mark is noted, after which the indicating dial plate corresponding to such number, is placed in position in the following manner. For purposes of illustration let it be assumed that when the bulb is in the freezing mixture, the indicating hand registers with the indicating mark designated by the numeral 5, as shown in Figure 4, in which case it is evident that indicating dial plate No. 5 is the proper one to use. While the bulb is still immersed in the freezing mixture, in order to maintain the arbor in its extreme position, the indicating hand is removed and indicating dial plate No. 5 is positioned in front of the calibration dial plate, the resiliency of the arms 8 being sufficient to permit the outer ends to be sprung apart so that the projections 16 on the dial plate may be received within the slots 9. It is, of course, understood that, when the indicating dial plate is thus secured to the arms 8, the indicating marks 32 and 212 of its scale will be in register respectively with the indicating marks of the calibration scale designated by the numerals 5 and 100. After the indicating dial plate is thus secured in place, the indicating hand is replaced upon the arbor and adjusted thereon so that it will register with the mark 32 of the indicating dial scale. The bulb 27 is now removed from the freezing mixture, and the plate 7 and the parts supported thereon are secured within the casing, whereupon the instrument is in condition for use.

In Figure 8 there is shown an annular casing 38 provided with an outwardly extending flange 39 at its outer end, having an annular recess forming a seat 40 bearing upon its surface a scale 41 similar in all respects to the scale upon the calibration dial plate 11, and with which the indicating hand 22 is adapted to co-operate during the calibration of the instrument. The actuating mechanism, the indicating dial plates and the method of determining which of the indicating dial plates is to be used, are as above described. Upon ascertaining which one of the indicating dial plates is to be used, it is secured upon the seat 40 with the low reading mark of its scale in register with the corresponding mark of the scale 41 on the seat 40 in a manner similar to that above described.

By providing a plurality of indicating dial plates having scales differing slightly in length from one another, any one of which may be applied to the instrument, depending upon the result of the calibration, all of the advantages of a hand-marked scale are obtained without incurring the expense entailed in marking the scale upon the dial due to the amount of time and labor involved.

While I have illustrated and described my invention in connection with two forms of instruments embodying the various features thereof, it will be understood that I do not intend to limit myself to the specific embodiments shown, but that I intend to cover my invention broadly in whatever form its principles may be employed.

Having thus described my invention, I claim:

1. In an instrument construction, the combination of indicating means, means provided with a calibration scale having a mark corresponding with a certain high temperature and a plurality of marks corresponding with a certain low temperature, and a plurality of scale bearing members any one of which is adapted to be operatively associated with said indicating means, the scales on said members differing in length from one another, the length of each scale corresponding to the length on the calibration scale between one of the plurality of marks corresponding to a certain low temperature and the mark corresponding to a certain high temperature, each of said marks corresponding to a certain low temperature and the corresponding scale-bearing member being similarly designated.

2. In an instrument construction the combination of indicating means, means provided with a calibration scale having a mark at one end and a plurality of spaced marks at the other end, and a plurality of scale-bearing members any one of which is adapted to be operatively associated with said indicating means, the scales on said members differing in length from one another, the length of each scale corresponding to the length on the calibration scale between one of the plurality of spaced marks at one end thereof and the mark at the other end thereof, each of said spaced marks and its corresponding scale-bearing member being similarly designated.

3. In an instrument construction the combination of indicating means, means provided with a calibration scale having a single indicating mark at one end and a plurality of spaced indicating marks at the other end, and a plurality of dial plates bearing scales differing from one another in length by an amount equal to the distance between adjacent marks of the plurality of marks in said calibration scale, each of said dial plates being adapted to be positioned with its scale in superposed registering relation with respect to said calibration scale, each of said spaced marks and its corresponding scale bearing member being similarly designated.

4. The herein described method which consists in subjecting temperature responsive means to a pre-determined temperature, subjecting said means to a second pre-determined temperature and observing on a calibration scale the distance traveled by said temperature responsive means between the positions of rests thereof corresponding to said temperatures, and positioning in operative relation to said temperature responsive means a member bearing a scale the length of which corresponds to the length of travel of said temperature responsive means as indicated upon said calibration scale.

5. The herein described method which consists in subjecting temperature responsive means including an indicator carried by an arbor and rotatable over a calibration scale to a predetermined temperature, adjusting said indicator to a position of rest registering with a fixed point of said calibration scale, subjecting said means to a second predetermined temperature and observing the distance travelled by said indicator between the positions of rest thereof, removing said indicator from said arbor, superposing upon the calibration scale an indicating scale corresponding in length with the length of travel of said indicator and registering with the path of travel thereof, and replacing said indicator upon said arbor in its second position of rest while said temperature responsive means is still subjected to the second predetermined temperature.

HERMAN SCHLAICH.